O. J. BEMISS.
SIGNALING DEVICE FOR AUTOMOBILES.
APPLICATION FILED JUNE 30, 1915.
1,179,497.
Patented Apr. 18, 1916.
2 SHEETS—SHEET 1.
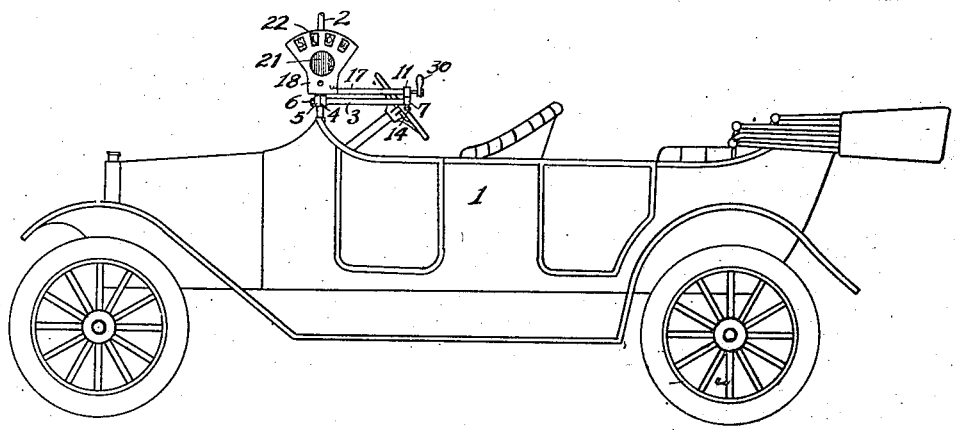
Fig. 1.
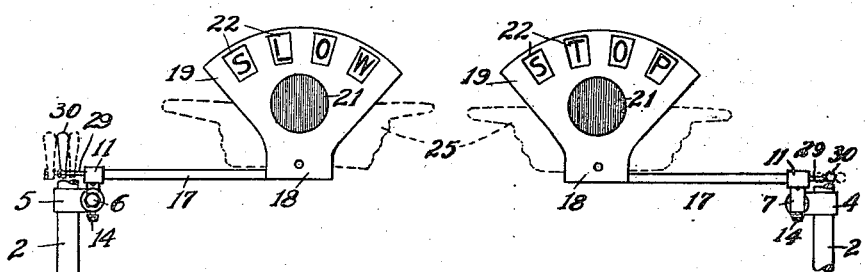
Fig. 3.
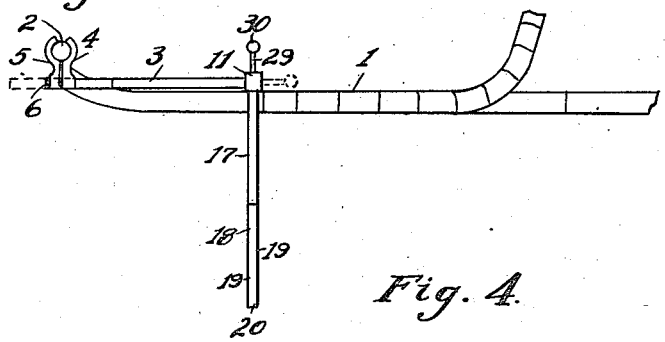
Fig. 2.
Fig. 4.
WITNESSES:
L. S. Woodhull
M. E. Brownell
INVENTOR
Orin J. Bemiss.
BY
B. P. Wheeler
ATTORNEY

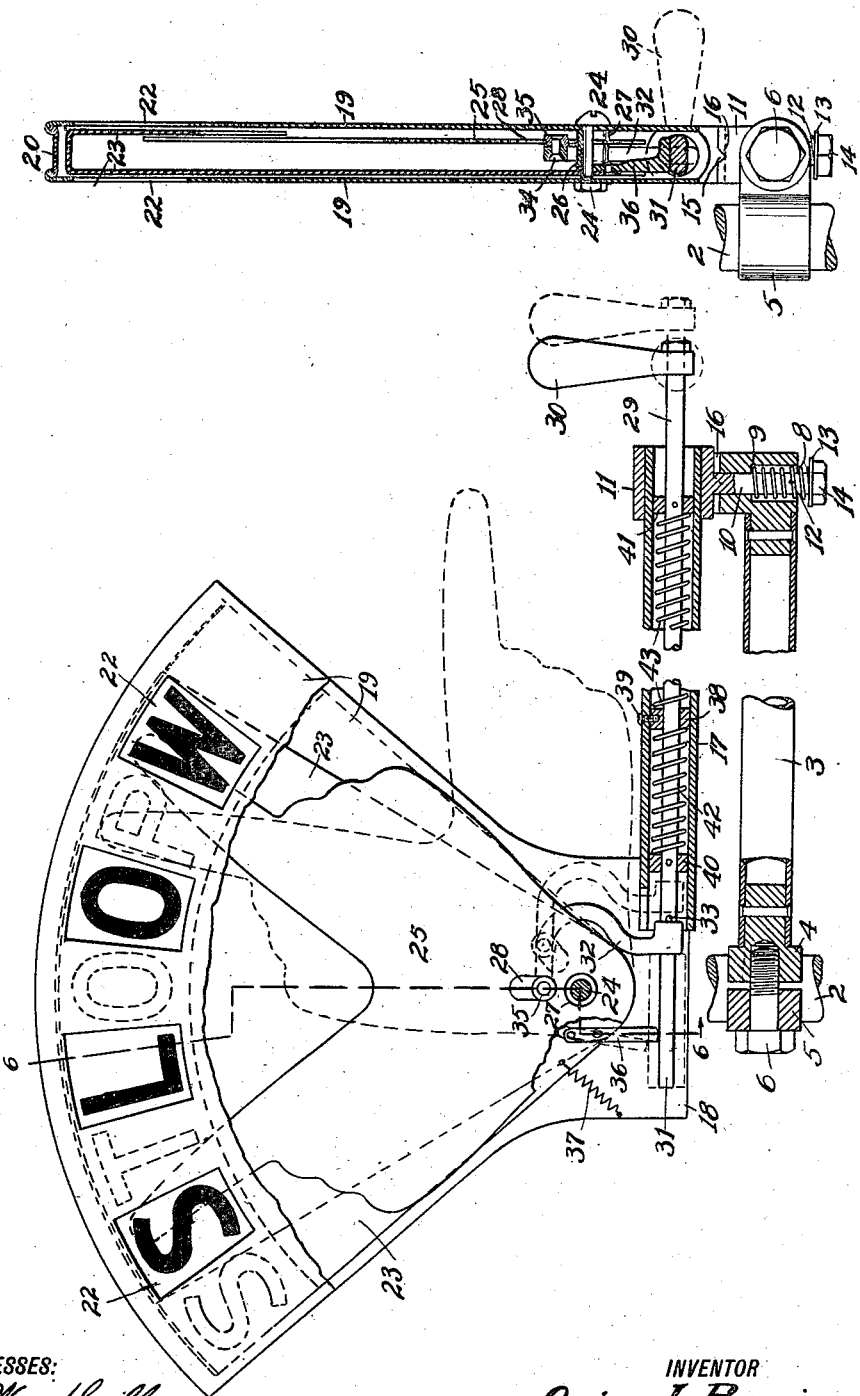

UNITED STATES PATENT OFFICE.

ORIN J. BEMISS, OF YPSILANTI, MICHIGAN.

SIGNALING DEVICE FOR AUTOMOBILES.

1,179,497.  Specification of Letters Patent.  Patented Apr. 18, 1916.

Application filed June 30, 1915. Serial No. 37,318.

*To all whom it may concern:*

Be it known that I, ORIN J. BEMISS, a citizen of the United States, residing at Ypsilanti, in the county Washtenaw, State of Michigan, have invented certain new and useful Improvements in Signaling Devices for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to signaling devices especially adapted for use on automobiles, and consists in the novel construction and arrangement of parts hereinafter fully set forth and claimed.

The object of the invention is the provision of a simple and efficient signaling device which may be attached to an automobile so as to be conveniently accessible for operation by the driver, and by means of which may be displayed a front and rear signal of such character as to indicate the intention of the driver to change the speed, stop or alter the course of the vehicle to either a right or a left hand direction, thereby notifying pedestrians and the drivers of other vehicles of the intended direction to be taken, and enabling them to direct and govern their course so as to avoid confusion and interference.

In attaining the above object the invention contemplates the employment of a structure comprising an arm mounted to swing on the body of the vehicle and carrying a signal housing containing a double index hand pivoted to swing into and out of said housing, together with a pivoted sign plate changeably displaying indicating characters, and an operating rod so arranged as to be actuated by the hand of the driver and to provide a selective control for actuating the index hand and sign plate independently, through the operation of which a signal may be displayed to indicate the contemplated change to be made in speed or in the course of the vehicle to either a right or left hand direction.

In the accompanying drawings I have shown the preferred form of embodiment of the novel features of the present invention, in which, Figure 1 is a side elevation of an ordinary automobile, showing the signaling device attached to the wind shield standard of the body in position for operation by the driver of the vehicle. Fig. 2 is a front elevation of the device extending laterally from the body of the vehicle, showing the housing with a circular colored surface indicating a danger sign and with the sign plate displaying through windows in the housing the word "Slow" to indicate the intention to slacken the speed of the vehicle, and also showing by dotted lines actuated positions of the operating rod and index hand indicating a change of course in both right and left hand directions. Fig. 3 is a rear elevation of the device in the same position as in Fig. 2, showing the back face of the housing arranged and inscribed to expose the same signal as that of the front, and showing by dotted lines actuated positions of the operating rod, with the sign plate displaying the word "Stop" and index hands indicating turns to the right and left. Fig. 4 is a plan view of the device in position extending laterally from the body of the vehicle and indicating by dotted lines its normal folded position lying parallel with the body. Fig. 5 is a central vertical longitudinal section through the supporting and swinging arms, the attaching clamp and the socket fitting in which the swinging arm is pivoted, a portion of the side of the housing being broken away showing the index hand in elevation and indicating by dotted lines an actuated position of said hand and its operating rod. Fig. 6 is a transverse vertical sectional view through the housing on dotted line 6—6 of Fig. 5.

Referring to the parts of the device by the characters of reference marked on the several views of the drawings, 1 represents an ordinary automobile body, to the windshield standard 2 of which, preferably on the side occupied by the driver, the signaling device is attached so as to normally lie parallel with the body, with the operating lever in position adjacent the steering wheel within easy reach of the hand of the driver, as shown in Fig. 1. The supporting arm 3 of the device, which is preferably tubular, is attached at one end to the standard 2 by means of a two-piece clamp, one part 4 of which embraces one side of the standard and is secured rigidly in the end of said arm, and the other part 5 embraces the opposite side of said standard and is secured to the part 4 by a binding bolt 6. Said arm is provided at its opposite end with a vertically extending sleeve or socket 7 rigidly secured therein, the lower end of which is counter-bored as at 8, forming a shoulder 9 therein, and extending through said socket is a stem 10 which carries at its upper end a transversely extending tubular head 11 seating against the upper end of the socket 7, and which is embraced at its lower end by a coiled spring 12 interposed and engaged at opposite ends, respectively, between the shoulder 9 of said socket and a washer 13 secured on said stem by a lock-nut 14. The head 11 is adapted to rotate on the socket 7 and is yieldably held in either of two positions at an angle of 90 degrees to each other by means of V-shaped lugs 15 projecting from the under face on diametrically opposite sides of said head, which register with corresponding V-shaped depressions 16 spaced at intervals of 45 degrees in the upper end of said socket, and into which said lugs are caused to seat when brought into registering alinement by the tension of the spring 12, thus serving as detents for yieldably retaining said head in the desired positions.

A tubular swinging arm 17 is fixedly secured at one end to extend through the head 11 and carries at its opposite end a vertically extending signal housing 18. This housing is preferably formed in the shape of a sector from two plates of sheet metal spaced apart in parallel relation and forming adjacent side walls 19 which are joined at their arcs by a spacing strip 20. The lower ends of these side walls are rigidly secured by brazing, or otherwise, upon opposite sides to the outer end of the swinging arm 17 (see Figs. 5 and 6). The outer faces of the housing are provided with suitably colored circular surfaces 21 as danger signals, and formed through each of the walls is a series of radial sight openings 22 spaced equidistant through the arc of the housing in registering alinement, through which letters forming the words "Slow" and "Stop" inscribed on a sign plate 23 within the housing may be alternately displayed to indicate the intention of the driver to slacken the speed or stop the vehicle. This sign plate is positioned within the housing in close proximity to one of the walls so as to extend over the sight openings 22 therein, and is folded at right angles and returned at its upper end sufficiently to overlap the openings in the opposite wall of the housing, each side of the plate being provided with letters adapted to register correspondingly with the openings in the sides of the housing, and the plate is pivoted at its lower end to swing on a screw stud 24 which is extended through the walls of the housing and secured by a binding nut 24', as shown in Fig. 6.

Located within the housing in adjacent spaced relation to the signal plate is a direction indicating member 25 in the form of a pair of integral index hands positioned approximately at an angle of 60 degrees to each other. This member is pivotally mounted at its lower end between spacing washers 26 and 27 on the stud 24, and is adapted to swing in a vertical plane from within said housing, respectively, in right and left hand directions to project said hands correspondingly in oppositely extending horizontal positions, as indicated by dotted positions in Figs. 2, 3 and 5. Formed through the body of the hand member 25, at a point centrally above and eccentric to its pivotal axis is an elongated vertical aperture 28 for affording operative connection with actuating means hereinafter described.

Motion is imparted to swing the sign plate to shift the letters thereon with respect to the sight openings of the housing, and to swing the index hands in opposite directions from and into the housing independently of said sign plate by means of an operating rod 29. This rod, which is fitted to slide through the arm 17, extends at one end beyond the head 11 of the socket 7, and is provided with an up-turned handle 30. The opposite end of this rod extends into the housing and is flattened upon opposite sides to form a double sided cam-shaped stem 31, which extends horizontally and centrally between the side walls of the housing with its major diameter normally lying in a horizontal plane. A vertically extending curved arm 32 rotatively receives the rod 29 between the inner end of the cam stem 31 and a pin 33 to secure it against axial movement thereon, and the upper end of this arm has a stud 34 extending transversely therethrough, upon the end of which an anti-friction roller 35 is rotatively mounted, being secured thereon by riveting over the ends of said stud (see Fig. 6). This roller is received in the aperture 28 of the index hand member 25, wherein it lies in peripheral contact with the edges of said aperture against which pressure is exerted through the longitudinal movement of the operating rod to swing said member upon its pivotal axis and extend either of its hands from within the housing to a horizontal position corresponding to the direction of movement of the operating rod, as indicated by dotted position in Fig. 5. In this position it will be noted the outer portion of the aperture 28 engages the roller 35 and serves as a limiting stop to the movement of the rod and index hand member.

Movement is imparted to the sign plate 23 through the rocking of the operating rod and its cam stem 31 by means of a bearing arm 36 which is secured at one end to said sign plate eccentrically of its pivotal axis, and is yieldably held at its opposite end in sliding contact with said cam stem by the tension of a coiled spring 37 attached at one end to said plate and at its opposite end to the housing. Said arm lies engaged with the minor portion of the cam and retains the sign plate in position to normally display the word "Slow" through the openings of the housing, as shown in Figs. 2 and 5, and when engaged with the major portion of said cam is raised and swings the sign plate sufficiently to expose through said opening a succeeding set of letters forming the word "Stop," as shown in Fig. 3.

The operating rod is mounted to slide through a fixed collar 38 secured in the bore of the tubular arm 17 by a pin or screw 39, and secured to said rod at opposite ends within said bore are collars 40 and 41, between which and said fixed collar 38 coiled springs 42 and 43 embracing said rod are interposed, respectively, and serve to return the rod against axial movement in either direction and to retain the index hands in the normal position within the housing.

The device when attached to a vehicle in position for operation normally lies parallel with the body, as shown in Fig. 1, in which position the sides of the housing will not be visible in front or rear directions, and no warning signal will be displayed. When the driver contemplates slowing down preparatory to stopping or changing the course of the vehicle, he will grasp the handle of the operating rod, the end of which, overhanging the axis of the pivoted arm, affords leverage through which to swing said arm by imparting an inward circular movement to said handle, thus carrying said arm outwardly to a position at right-angles to the body of the vehicle, where it will be retarded and retained by the engagement of the detents of the pivoted head with the socket support, as shown in Figs. 2, 3 and 4. In this position the faces of the housing bearing the danger signals and indicating characters will be so displayed as to be visible, respectively, in front and rear directions with the vehicle, and will thus serve to forewarn vehicles approaching in either direction of the intention to "slow" down, or if a stop is to be made the handle is rocked to a horizontal position, causing the cam to shift the sign play and display the word "Stop." If no change in the course of the vehicle is to be made no further operation of the device will be required except to return the arm when desired to its normal position by imparting an outward circular movement to the handle of the operating rod until the arm reaches a position parallel with the body, where it will be yieldably retained by the engagement of the detents as before described.

When it is intended to turn the vehicle in a right-hand direction, the arm is first swung outwardly to display the warning signal "Slow" of the housing, when by drawing the handle of the operating rod toward the driver the longitudinal movement of said rod will carry the roller engaged in the aperture of the index hands laterally of the housing, causing one of said hands to swing from within the housing to a horizontal position in the direction of the movement of the operating rod, in which position the hand will indicate a turn to the right and will thus give warning of such intention, and by the return movement of the operating rod this hand will be restored to its normal position within the housing. The companion hand will swing within the housing unexposed by either of the movements of the operating rod just described, owing to the angle of the hand with respect to the housing, but by a further outward movement of the operating rod this hand will be caused to swing outwardly in the opposite direction to indicate the intention to turn to the left, as indicated by dotted lines in Figs. 2 and 3. By this arrangement a selective control is provided which enables the operator to actuate the hands and sign plate independently of the other, and to expose either of the hands separately in opposite directions through the simple manipulation of a single operating rod, which also serves as a control for swinging the arm and housing to display the warning signals thereon in both front and rear directions.

I claim:

1. In a signaling device, a supporting bracket, an arm pivoted to swing on said bracket, a housing carried on said arm and having warning indicating characters displayed thereon, an index hand pivoted in said housing to swing therefrom, and an operating member mounted to move longitudinally of said arm and slidably engaged with said hand eccentrically of its pivotal axis for imparting a swinging movement thereto through the longitudinal movement of said operating member in either direction.

2. In a signaling device, a supporting socket, a hollow arm pivoted to swing on said socket, a housing carried on said arm to swing therewith and having warning indicating characters displayed on opposite sides thereof, an index hand pivoted in said housing to swing therefrom, an operating rod movably extending longitudinally through said arm and slidably engaging said hand eccentric to its pivotal axis for imparting a swinging movement thereto through the longitudinal movement of said rod, and a handle on said rod for imparting movement thereto and for swinging said arm on said socket.

3. In a signaling device, a supporting socket, a hollow arm pivoted to swing on said socket, a housing carried on said arm to swing therewith and having sight openings formed through opposite sides thereof, a sign plate pivoted in said housing and having warning indicating characters displayed on opposite sides thereof in registering alinement with said openings, an index hand pivoted in said housing to swing therefrom, and an operating rod mounted to rock and to move longitudinally through said arm and connected with means engaging said sign plate and said hand eccentrically of their pivotal axes for imparting a swinging movement thereto, respectively, through the rocking and longitudinal movements of said operating rod.

4. In a signaling device, a supporting bracket having a socket thereon, a hollow arm mounted on a stem journaled to turn in said socket, a housing mounted on said arm and having sight openings formed through opposite sides thereof, a sign plate pivoted in said housing and having warning indicating characters displayed on opposite sides thereof in registering alinement with said openings, an arm on said sign plate eccentric to its pivotal axis, an index hand pivoted in said housing to swing therefrom in opposite directions and having an elongated aperture therein eccentric to its pivotal axis, an operating rod mounted to rock and to move axially through said first named arm and having a cam slidably engaging said second named arm for imparting movement to swing said plate through the rocking movement of said rod, and an arm carried by said rod and slidably engaging said aperture for imparting a swinging movement to said hand through the axial movement of said rod.

5. In a signaling device, a supporting bracket having a socket thereon, a hollow arm mounted to swing on a stem journaled to turn in said socket, a detent on said socket, a spring on said stem engaging said socket for yieldably retaining said stem thereon, a housing mounted on said arm and having sight openings formed through opposite sides thereof, a sign plate pivoted in said housing and having warning indicating characters displayed on opposite sides thereof in registering alinement with said openings, an arm on said sign plate eccentric to its pivotal axis, an index hand pivoted in said housing to swing therefrom in opposite directions and having an elongated aperture therein eccentric to its pivotal axis, an operating rod mounted to rock and to move axially through said first named arm and having a cam slidably engaging said second named arm for imparting movement to swing said plate through the rocking of said rod, an arm carried by said rod and slidably engaging said aperture for imparting a swinging movement to said hand through the axial movement of said rod, and spring tensioned means for returning said rod to its normal position.

In testimony whereof, I sign this specification.

ORIN J. BEMISS.